United States Patent
Fuehrer et al.

(10) Patent No.: US 10,535,940 B2
(45) Date of Patent: Jan. 14, 2020

(54) PLUG-IN CONNECTOR WITH A HEAT CAPACITY ELEMENT ARRANGED ON A CONTACT ELEMENT

(71) Applicant: Phoenix Contact E-Mobility GmbH, Schieder-Schwalenberg (DE)

(72) Inventors: Thomas Fuehrer, Blomberg (DE); Holger Seifert, Bad Driburg (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 16/081,036

(22) PCT Filed: Mar. 15, 2017

(86) PCT No.: PCT/EP2017/056071
§ 371 (c)(1),
(2) Date: Aug. 30, 2018

(87) PCT Pub. No.: WO2017/162495
PCT Pub. Date: Sep. 28, 2017

(65) Prior Publication Data
US 2019/0020140 A1    Jan. 17, 2019

(30) Foreign Application Priority Data
Mar. 22, 2016    (DE) .......................... 10 2016 105 308

(51) Int. Cl.
*H01R 13/00*    (2006.01)
*H01R 13/04*    (2006.01)
*B60L 53/16*    (2019.01)

(52) U.S. Cl.
CPC ............. *H01R 13/04* (2013.01); *B60L 53/16* (2019.02); *H01R 2201/26* (2013.01);
(Continued)

(58) Field of Classification Search
CPC ...... H01R 13/04; H01R 13/5202; H01R 4/64; B60L 53/16; Y02T 90/14; Y02T 10/7005; Y02T 10/7072
(Continued)

(56) References Cited

U.S. PATENT DOCUMENTS 5,909,099 A    6/1999    Watanabe et al.
6,250,975 B1 *  6/2001    LaPointe ............... H01R 4/64
                                                         439/883

(Continued)

FOREIGN PATENT DOCUMENTS

CN    102082347 A    6/2011
DE    102011001471 A1    9/2012
(Continued)

*Primary Examiner* — Jean F Duverne
(74) *Attorney, Agent, or Firm* — Leydig, Voit & Mayer, Ltd.

(57) ABSTRACT

A plug-in connector part for connection to a mating plug-in connector part includes: a housing which has a plug-in portion for plug-in connection to the plug-in connector part; at least one contact element, arranged in the plug-in portion and having a shaft portion, for electrically contacting an associated mating contact element of the mating plug-in connector part; and a heat capacity element, which is arranged on the shaft portion of the at least one contact element and rigidly connected to the shaft portion, for absorbing heat from the at least one contact element.

11 Claims, 6 Drawing Sheets

(52) U.S. Cl.
CPC ........ *Y02T 10/7005* (2013.01); *Y02T 10/7072* (2013.01); *Y02T 90/14* (2013.01)

(58) Field of Classification Search
USPC ........................................................ 439/587
See application file for complete search history.

(56) References Cited

U.S. PATENT DOCUMENTS

| | | | |
|---|---|---|---|
| 7,985,092 | B2 | 7/2011 | Suzuki et al. |
| 10,180,291 | B2 | 1/2019 | Hohmann et al. |
| 2009/0157091 | A1* | 6/2009 | Buysman ............. A61N 1/0551 606/129 |
| 2009/0239408 | A1 | 9/2009 | Sacher et al. |
| 2011/0297334 | A1* | 12/2011 | Bohlen .................... E06B 9/62 160/310 |
| 2014/0199881 | A1 | 7/2014 | Legerwood et al. |
| 2015/0288090 | A1* | 10/2015 | Shigeta .............. H01R 13/5202 439/587 |

FOREIGN PATENT DOCUMENTS

| | | | |
|---|---|---|---|
| DE | 102010007975 | B4 | 10/2012 |
| DE | 102014202466 | A1 | 8/2015 |
| EP | 0668632 | A2 | 8/1995 |
| EP | 2104183 | A1 | 9/2009 |
| EP | 2993741 | A1 | 3/2016 |
| WO | WO 2015119791 | | 8/2015 |

\* cited by examiner

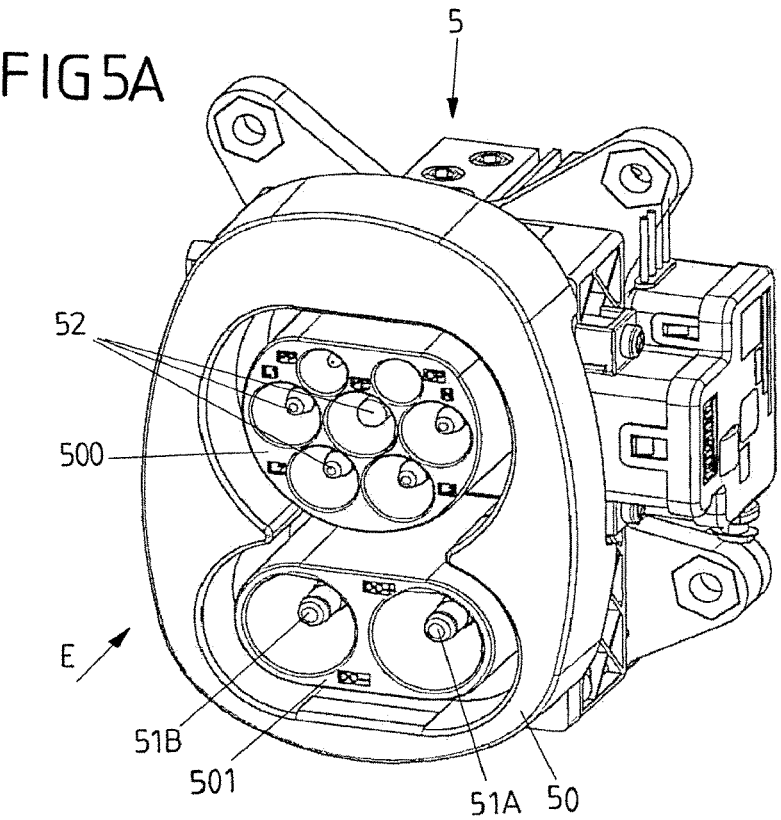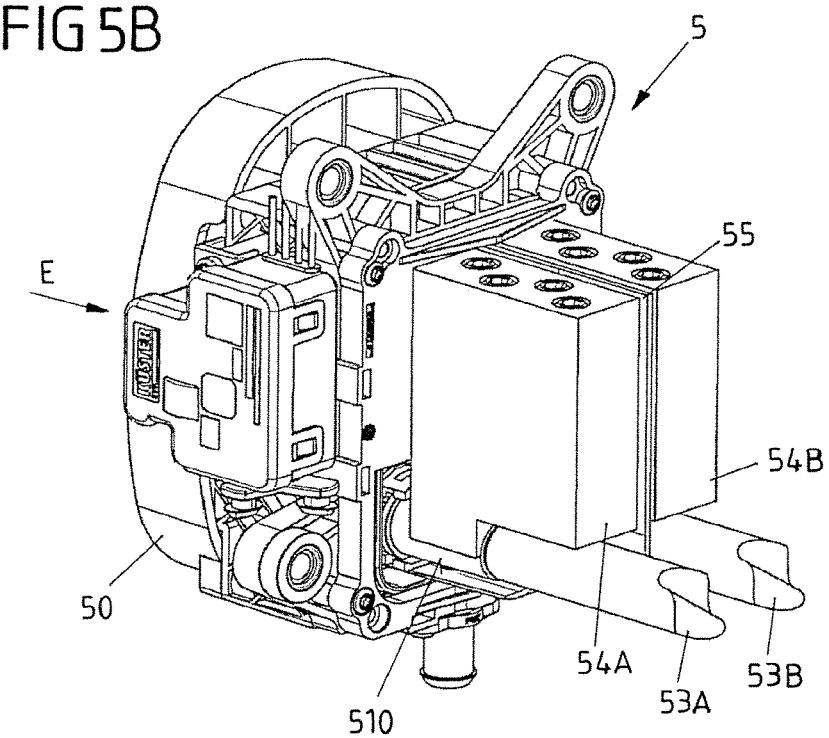

PLUG-IN CONNECTOR WITH A HEAT CAPACITY ELEMENT ARRANGED ON A CONTACT ELEMENT

CROSS-REFERENCE TO PRIOR APPLICATIONS

This application is a U.S. National Phase application under 35 U.S.C. § 371 of International Application No. PCT/EP2017/056071, filed on Mar. 15, 2017, and claims benefit to German Patent Application No. DE 10 2016 105 308.2, filed on Mar. 22, 2016. The International Application was published in German on Sep. 28, 2017 as WO 2017/162495 under PCT Article 21(2).

FIELD

The invention relates to a plug-in connector part for connection to a mating plug-in connector part.

BACKGROUND

A plug-in connector part of this kind comprises a housing that has a plug-in portion for plug-in connection to the mating plug-in connector part, and at least one contact element, arranged on the plug-in portion and having a shaft portion, for electrically contacting an associated mating contact element of the mating plug-in connector part.

A plug-in connector part of this kind can be used, for example, as a charging plug or as a charging socket for charging an electrically powered vehicle (also referred to as an electric vehicle). A charging socket of this kind is arranged, for example, on a vehicle and can be connected in a plug-in manner to an associated mating plug-in connector part in the form of a charging plug on a cable that is connected to a charging station, in order to thus establish an electrical connection between the charging station and the vehicle.

In principle, charging currents can be transmitted as direct currents or alternating currents, charging currents in the form of direct current in particular having a high amperage, for example greater than 200 A or even greater than 300 A or even 350 A, it being possible for said charging currents to cause the cable, as well as a plug-in connector part connected to the cable, to heat up.

A charging cable known from DE 10 2010 007 975 B4 has a cooling line which comprises a supply line and a return line for a coolant, therefore allowing a coolant to flow in and out of the charging cable. The cooling line in DE 10 2010 007 975 B4 is used to dissipate heat produced due to energy loss from an energy store of a vehicle, but also to additionally cool the cable itself.

In a charging system for charging an electric vehicle, heat is produced not only in the cable by means of which a charging plug is connected to a charging station, for example, but also in the charging plug and in a charging socket into which the charging plug is plugged. In this case, heat is produced in particular in contact elements, for example of the charging socket, by means of which elements electrical contact with associated mating contact elements is produced, for example by a charging socket, when the charging plug is plugged into the charging socket.

Contact elements of this kind, which are made of an electrically conductive metal material, for example a copper material, are heated up when a charging current flows via the contact elements, which, in principle, are dimensioned on the basis of the charging current to be transmitted and such that the contact elements have a sufficient current-carrying capacity and the heating of the contact elements is limited. In this case, a contact element is dimensioned so as to be larger the higher the charging current to be transmitted is.

However, limits are set on scaling the size of the contact element against increasing charging current, not only on account of the associated installation space requirements, the weight and the costs, but additionally there are normative standards for the dimensioning of the contact elements that preclude scaling. There is therefore a requirement to transmit a high charging current by means of a relatively small contact element.

In a charging system known from WO 2015/119791 A1 for charging an electric vehicle, coolant lines are guided inside a charging cable, by means of which lines heat can also be dissipated from the region of a plug-in connector part connected to the charging cable.

In a charging system known from U.S. Pat. No. 5,909,099, charging currents are transmitted, using a transformer, via a core arranged in a plug-in connector part. A heating line for dissipating heat can be extended in the core.

SUMMARY

In an embodiment, the present invention provides a plug-in connector part for connection to a mating plug-in connector part, comprising: a housing which has a plug-in portion configured for plug-in connection to the plug-in connector part; at least one contact element, arranged in the plug-in portion and having a shaft portion, configured to electrically contact an associated mating contact element of the mating plug-in connector part; and a heat capacity element, which is arranged on the shaft portion of the at least one contact element and rigidly connected to the shaft portion, configured to absorb heat from the at least one contact element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 5A shows the front of another embodiment of a plug-in connector part in the form of a charging socket;

FIG. 5B shows the rear of the plug-in connector part;

DETAILED DESCRIPTION

Figure 1:
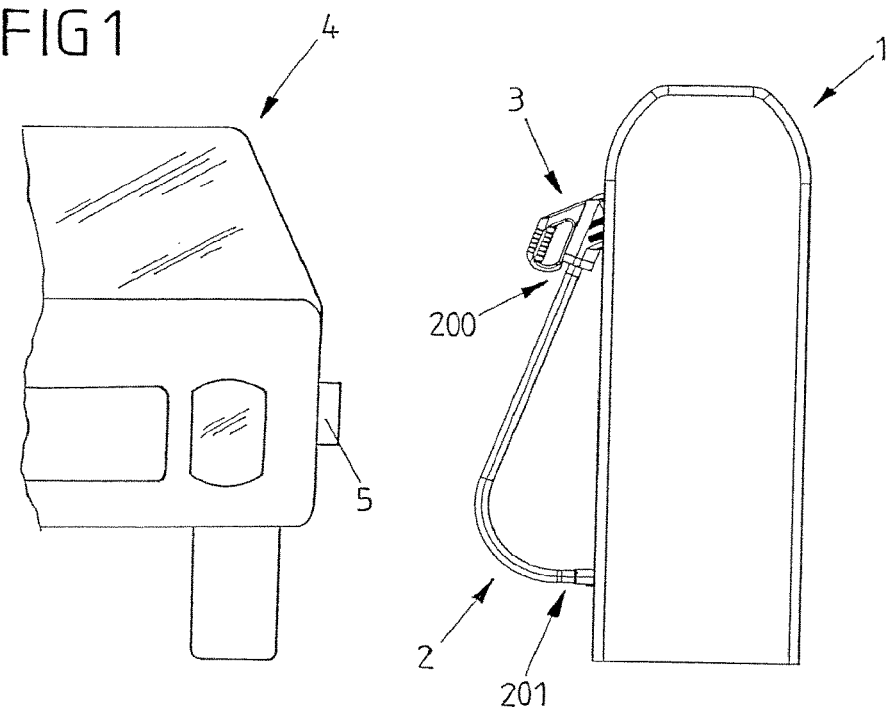
FIG. 1 shows a charging station that has a cable arranged thereon.

In an embodiment, the plug-in connector part has a heat capacity element, arranged on the shaft portion of the at least one contact element and rigidly connected to the shaft portion, for absorbing heat from the at least one contact element.

A heat capacity element is therefore arranged on a contact element that is designed to absorb heat from the contact element. The heat capacity element has a high heat capacity and is thermally connected to the contact element such that heat from the contact element can flow into the heat capacity element and be absorbed therein.

This is based on the concept that, on account of providing a plug-in connector part with an increased heat capacity, the heating of the plug-in connector part, in particular of the contact elements of the plug-in connector part, can at least be slowed down. This can be expedient, for example, in a plug-in connector part in the form of a charging socket on an electric vehicle, and can prevent excess heating of such a charging socket effectively.

It is generally assumed that a charging current is applied to a charging socket on an electric vehicle only irregularly and intermittently, and therefore that the charging socket heats up over a relatively small time period; however, the charging socket can then take a relatively long time to cool down again. The charging time of a charging process, in particular of a fast charging process, can be less than 1 hour, for example in the range of between 10 minutes and 30 minutes. After being charged, the vehicle is driven over a prolonged time period before the vehicle is charged again and the charging currents are therefore applied to the charging socket again. Whereas in certain circumstances a charging plug on a charging station is used in continuous operation to charge a plurality of electric vehicles consecutively and is therefore, in certain circumstances, applied with charging currents almost uninterruptedly, a charging socket can, after a charging process, cool down again over a prolonged time period.

If a plug-in connector part, for example in the form of a charging socket, has an increased heat capacity, the heating of the plug-in connector part is thus delayed. The heat capacity elements of the plug-in connector part, for example in the form of a charging socket, can in this case be dimensioned such that, during a conventional charging process, the heating can remain below a predetermined limit, for example under 50 K, meaning that excessive, prohibited heating of the plug-in connector part in the form of the charging socket during a charging process is precluded.

By using heat capacity elements of this kind, excessive heating of the plug-in connector part can therefore be prevented, without active cooling being provided. Heat capacity elements of this kind can be relatively cost-effective and simple to provide.

The plug-in connector part preferably has a plurality of contact elements arranged in the plug-in portion. In this case, a (separate) heat capacity element is preferably arranged on each contact element such that a heat capacity element can absorb heat in a targeted manner from the relevant associated contact element.

The contact elements are electrically conductive and the heat capacity elements are preferably also produced from a metal material, for example copper or aluminum, in order to obtain good thermal conductivity in addition to a relatively high heat capacity. The heat capacity elements are therefore likewise electrically conductive, meaning that heat capacity elements of different contact elements have to be electrically insulated from one another to prevent a current flow via the heat capacity elements between different contact elements.

For the purpose of electrical insulation, a housing partition made of an electrically insulating material, for example a plastics material, can be arranged between adjacent heat capacity elements of two contact elements, for example. A plurality of heat capacity elements associated with different contact elements can therefore be arranged next to one another in the housing of the plug-in connector part and are, in pairs, separated from one another by housing partitions such that electrical insulation is provided between the heat capacity elements; nevertheless, the heat capacity elements can be arranged spatially close together inside the housing of the plug-in connector part.

In one embodiment, the heat capacity element associated with a contact element is attached to the shaft portion of the associated contact element by means of an attachment piece. The shaft portion is cylindrical, for example. Accordingly, the attachment piece has a concave attachment surface that is complementary to the shape of the shaft portion such that the attachment piece can be attached to the cylindrical shaft portion in a planar manner and connected to the shaft portion in a planar manner.

The heat capacity element is rigidly connected to the shaft portion of the associated contact element. The connection produced can be frictional, for example by using a screw element. It is also conceivable and possible for the heat capacity element to be form-fittingly connected or integrally bonded to the shaft portion, for example by adhesively bonding or by welding.

If, for example, the attachment piece is frictionally connected to the shaft portion of the contact element, for example by the attachment piece being screwed onto the shaft portion, a thermally conductive paste can advantageously be provided between the attachment piece and the shaft portion, by means of which paste a favorable heat transfer can be achieved for a heat flow between the shaft portion and the heat capacity element.

The heat capacity element is preferably formed by a solid body. The heat capacity element can for example be cuboidal, it being possible for cooling ribs, for example, to be arranged on the heat capacity element, by means of which ribs heat can be favorably emitted to the environment.

In a further development, the heat capacity element can have one or more openings in which a material having particular properties for heat absorption can be arranged. For example, a phase change material can be arranged in the openings which, upon heating, carries out a phase transition, for example from solid to liquid, and is thereby capable of absorbing a large amount of heat energy. Phase change materials of this kind use the enthalpy of thermodynamic changes in state of a storage medium, for example of a phase transition from solid to liquid and vice versa. Phase change materials can use salts or paraffins as the storage medium, for example. It is also conceivable to use low-melting metal alloys, for example a Field's metal.

A phase change material of this kind is introduced into the openings of the heat capacity element and, in an initial state, when the heat capacity element is not heated, is in a solid form, for example. If the heat capacity element is heated on account of the associated contact element being heated, the phase change material carries out a phase transition from solid to liquid and absorbs heat in the process. In a reversed phase transition, heat would then be re-emitted accordingly.

The openings in the heat capacity element can be closed off on the outside by a suitable closing element such that the phase change material, in a liquid state, cannot escape from the openings.

FIG. 1 shows a charging station 1 which is used for charging an electrically operated vehicle 4 (also referred to as an electric vehicle). The charging station 1 is designed to provide a charging current in the form of an alternating current or a direct current and has a cable 2, one end 201 of which is connected to the charging station 1 and another end 200 of which is connected to a mating plug-in connector part 3 in the form of a charging plug.

Figure 2:
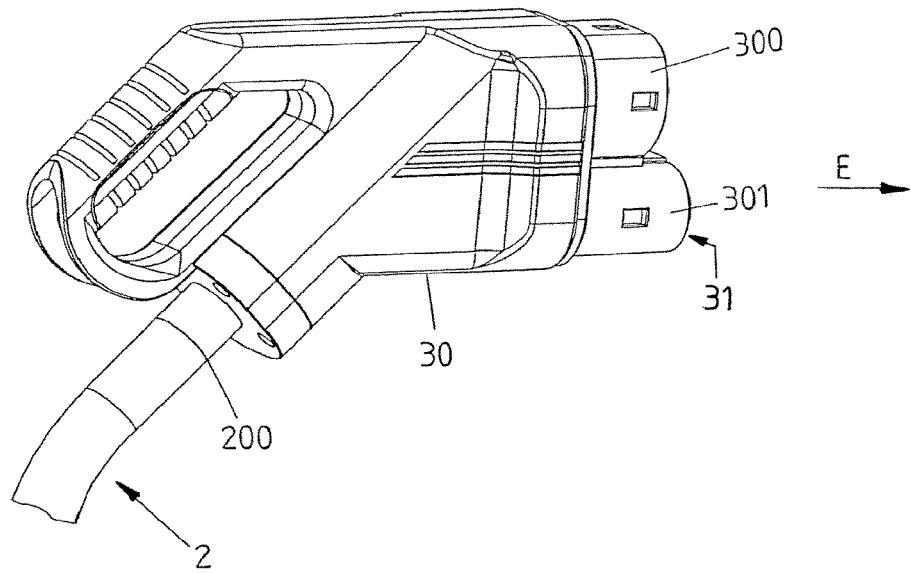
FIG. 2 shows a plug-in connector part in the form of a charging plug.

As can be seen in the enlarged view of FIG. 2, the mating plug-in connector part 3 has plug-in portions 300, 301 on a housing 30, by means of which portions the plug-in connector part 3 can be brought into engagement in a plug-in manner with an associated plug-in connector part 5 in the form of a charging socket on the vehicle 4. In this way, the charging station 1 can be electrically connected to the vehicle 4 in order to transmit charging currents from the charging station 1 into the vehicle 4.

In order to allow rapid charging of the electric vehicle 4, e.g. in the context of a fast charging process, the transmitted charging currents have a high amperage, e.g. greater than 200 A, optionally even of the magnitude of 350 A or more. On account of such high charging currents, thermal losses occur on the cable 2 and also on the charging plug 3 and the charging socket 5, which can lead to the cable 2, the charging plug 3 and the charging socket 40 being heated.

Figure 3A:
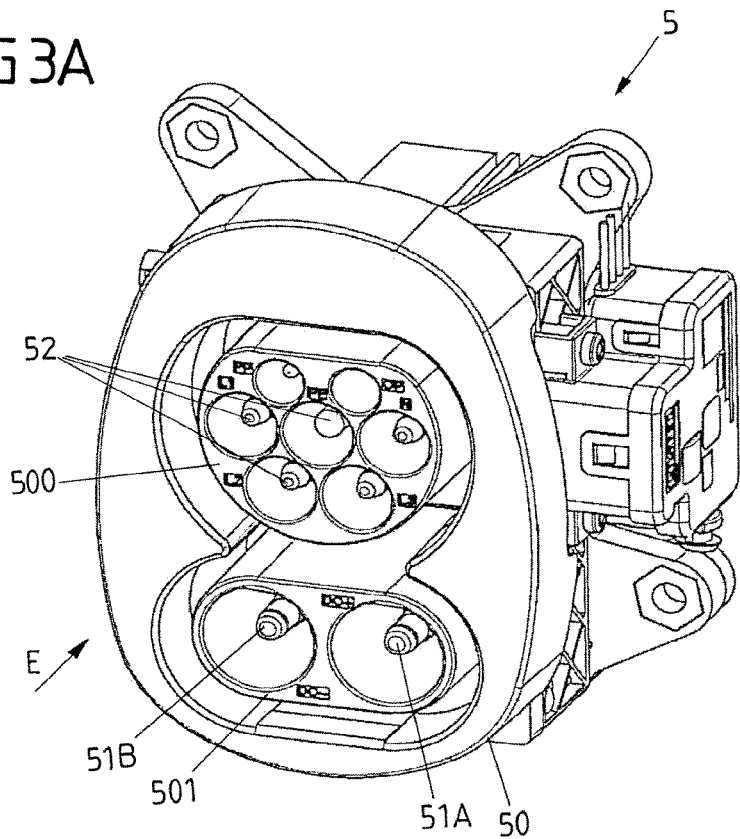
FIG. 3A shows the front of a plug-in connector part in the form of a charging socket.
Figure 3B:
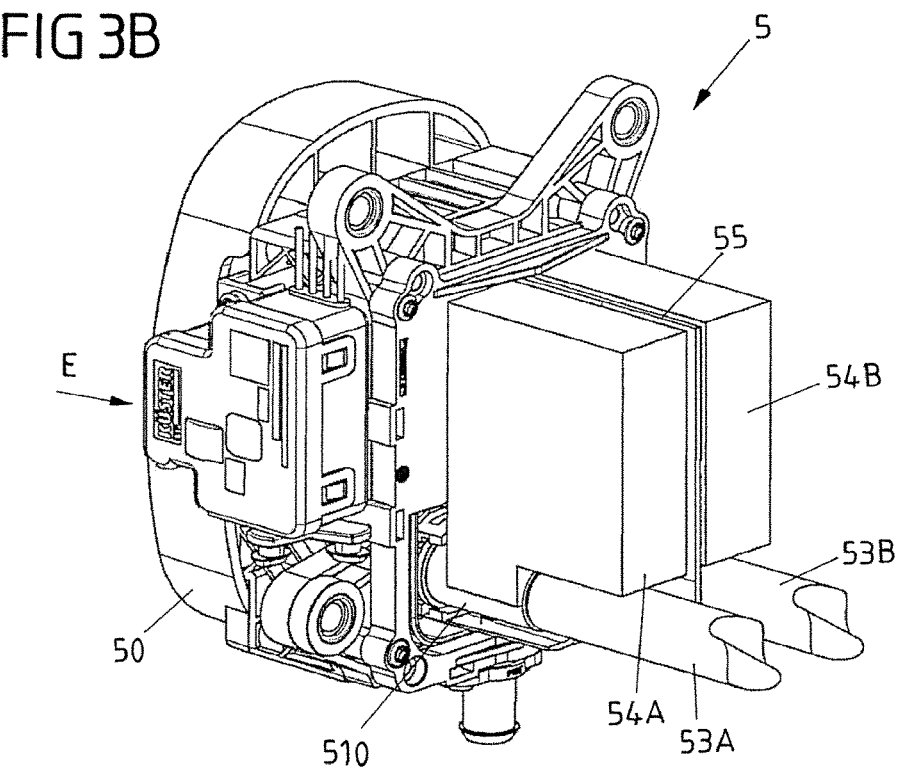
FIG. 3B shows the rear of the plug-in connector part.

FIGS. 3A and 3B show an embodiment of a plug-in connector part 5 in the form of a charging socket. The plug-in connector part 5 has a housing 50 on which plug-in portions 500, 501 are formed which can be brought into engagement with the plug-in portions 300, 301 of the mating plug-in connector part 3 in the form of the charging plug (see FIG. 2). In this case, for example, five contact elements 52 in the form of load contacts are arranged on a first, upper plug-in portion 500 for transmitting a (multiphase) alternating current, in addition to two signal contacts. In contrast, two contact elements 51A, 51B are arranged on a second, lower plug-in portion 501 for transmitting a charging current in the form of a direct current.

The mating plug-in connector part 3 in the form of the charging plug can be brought into engagement in a plug-in manner with the plug-in connector part 5 in the form of the charging socket in a plug-in direction E. In a plugged-in position, contact elements 31 on the plug-in portions 300, 301 contact the contact elements 51A, 51B, 52 of the plug-in portions 500, 501 of the plug-in connector part 5 such that charging currents can flow in order to charge the electric vehicle 4.

Figure 4A:
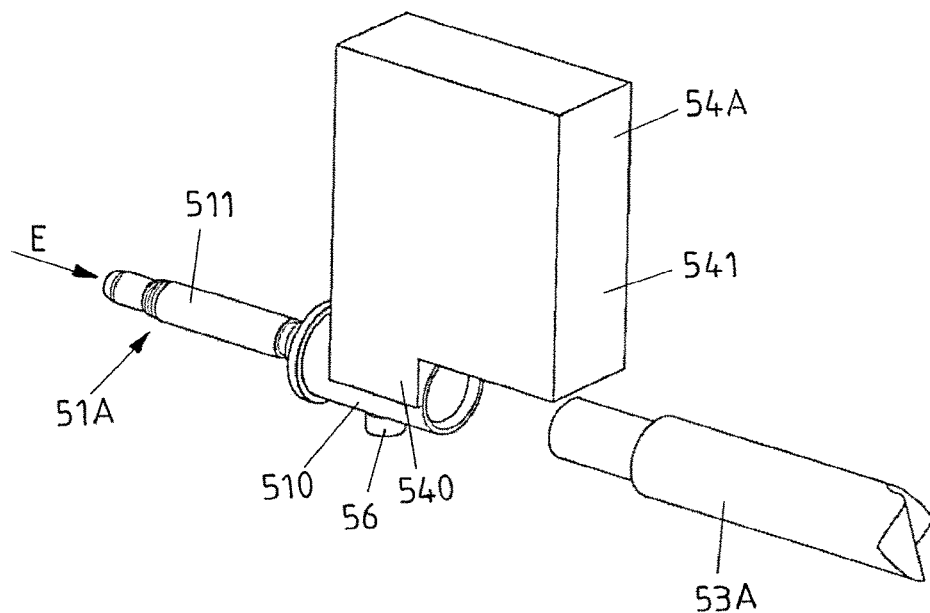
FIG. 4A is a separate view of a contact element of the plug-in connector part together with a heat capacity element arranged thereon.
Figure 4B:
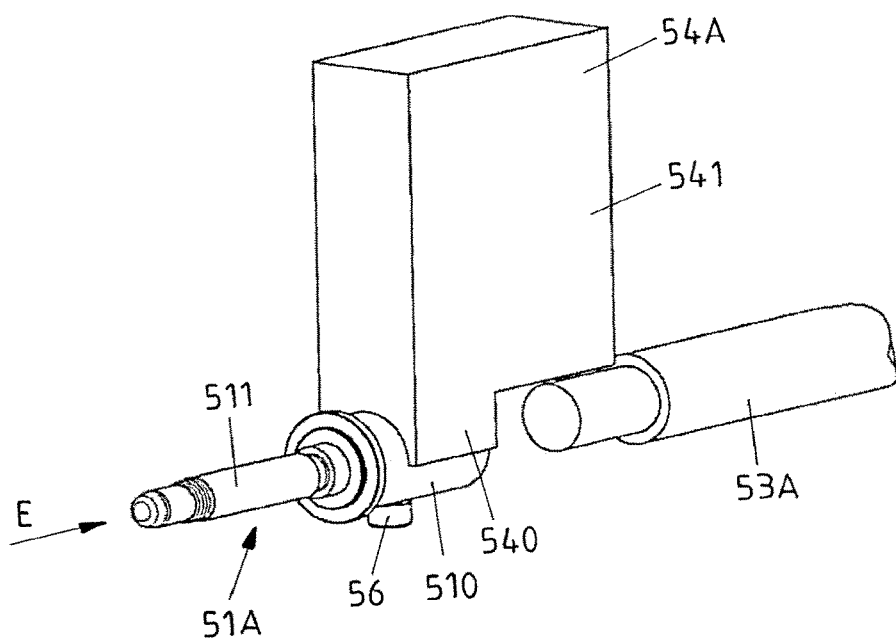
FIG. 4B is another view of the contact element.
Figure 6A:
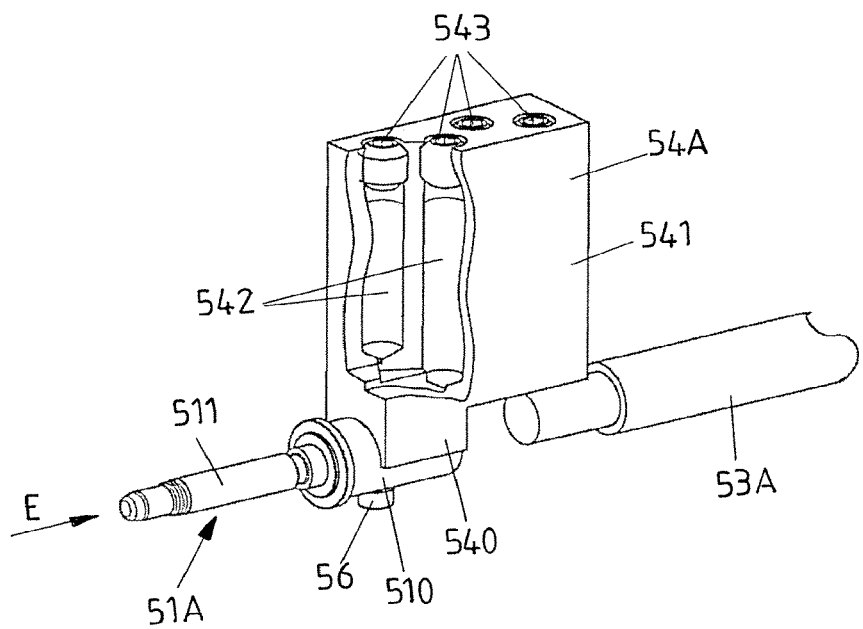
FIG. 6A is a separate view of a contact element together with a heat capacity element arranged thereon.
Figure 6B:
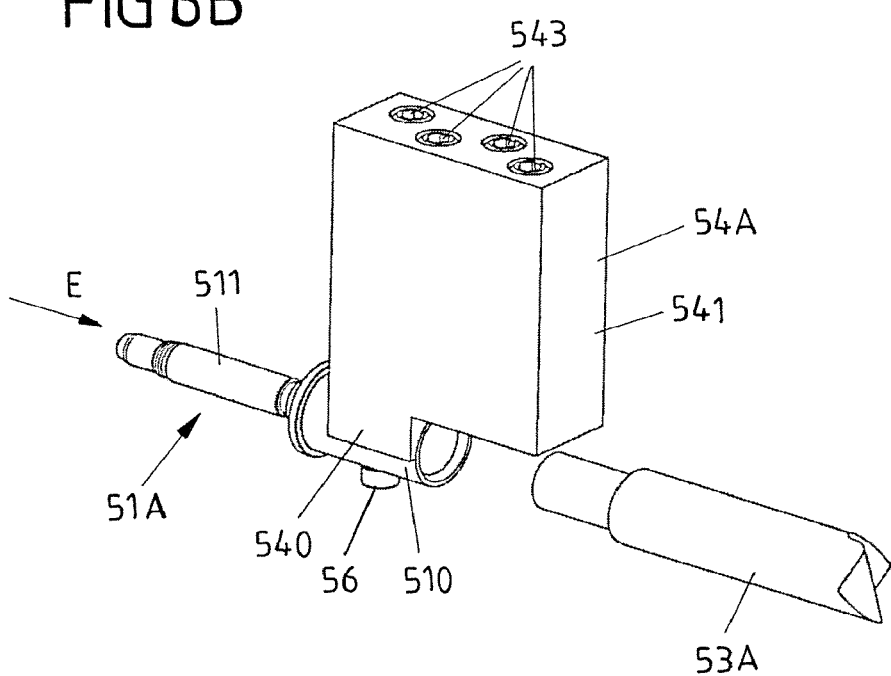
FIG. 6B is another view of the contact element.

In the embodiment according to FIGS. 3A and 3B, the contact elements 51A, 51B, at the ends facing away from the plug-in portion 501, are connected to load lines 53A, 53B, respectively, via which a charging current is guided to the contact elements 51A, 51B. As can be seen in the separate views according to FIGS. 4A and 4B, said load lines 53A, 53B are each plugged into a shaft portion 510 of the associated contact element 51A, 51B and in this way are electrically contacted to the relevant associated contact element 51A, 51B.

Each contact element 51A, 51B has a substantially cylindrical basic shape and comprises a cylindrical shaft portion 510, via which the connection to the associated load line 53A, 53B is established, and a contact pin 511 that projects into the plug-in portion 501 and is used to electrically contact an associated mating contact element 31 of the mating plug-in connector part 3.

If charging currents are transmitted from the charging station 1 into the vehicle 4 and if these charging currents flow via the contact elements 51A, 51B of the plug-in connector part 5, the contact elements 51A, 51B will heat up. In order to delay the heating of the contact elements 51A, 51B, a heat capacity element 54A, 54B having a solid body 541 made of a material of good thermal conductivity (for example copper or aluminum) and providing a relatively high heat capacity for absorbing heat from the contact element 51A, 51B is arranged on each contact element 51A, 51B.

Figure 7:
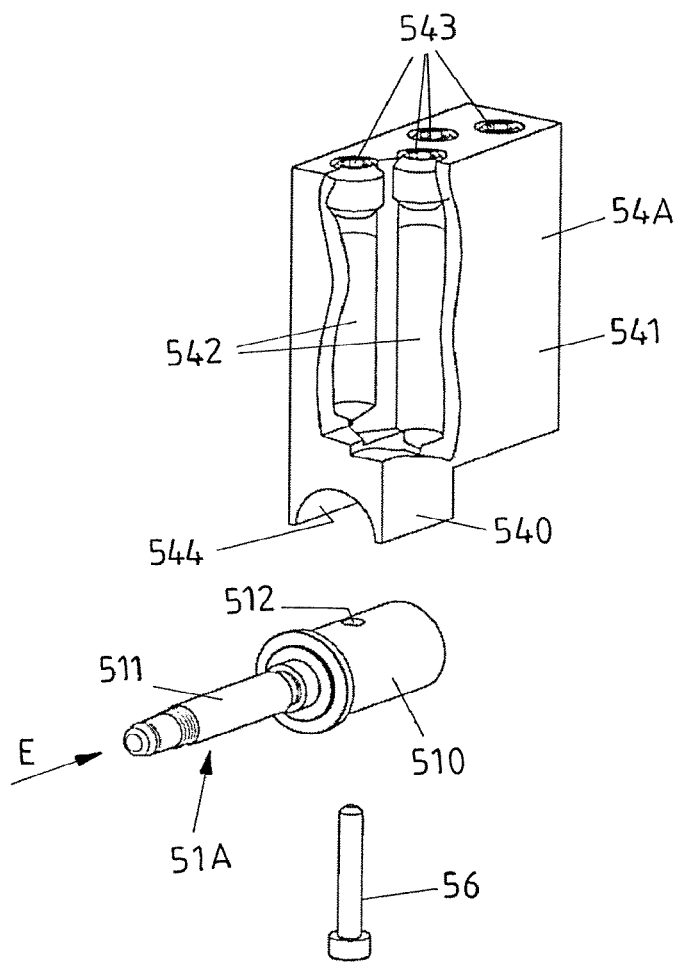
FIG. 7 is an exploded view of the contact element.

The heat capacity element 54A, 54B is connected to the shaft portion 510 of the relevant associated contact element 51A, 51B by means of an attachment piece 540. For this purpose, the attachment piece has, as can be seen in FIG. 7, an attachment surface 544 which is attached in a planar manner to the cylindrical shaft portion 510 of the associated contact element 51A, 51B and fits neatly onto the shaft portion 510 in a planar manner by virtue of a shape that is complementary to the cylindrical shaft portion 510.

In the embodiment shown, the heat capacity element 54A, 54B is frictionally connected to the shaft portion 510 by means of a screw element 56. A thermally conductive paste can be provided between the shaft portion 510 and the attachment surface 544 of the attachment piece 540 in order to provide an advantageous heat transition between the shaft portion 510 and the heat capacity element 54A, 54B.

A charging process for an electric vehicle 4 can be, for example, of the magnitude of an hour, in certain circumstances even significantly faster than an hour, for example in a range of between 10 minutes and 30 minutes. Although in certain circumstances the plug-in connector part 3 in the form of the charging plug is subjected to a plurality of consecutive charging processes, generally some time will pass before the electric vehicle 4 is charged again and charging currents are again applied to the plug-in connector part 5 in the form of the charging socket on the vehicle 4. By suitably dimensioning the heat capacity elements 54A, 54B, excessive heating of the plug-in connector part 5 in the form of the charging socket can therefore be prevented throughout a charging process, for example heating beyond 50 K. By providing the heat capacity elements 54A, 54B, the heating of the contact elements 51A, 51B is delayed by providing the contact elements 51A, 51B with an increased heat capacity such that a maximum permitted heating of the contact elements 51A, 51B cannot be exceeded within a conventional charging process.

As can be seen in FIG. 3B, the heat capacity elements 54A, 54B are arranged next to one another on the housing 50. In order to produce a favorable heat transfer to the contact elements 51A, 51B, the heat capacity elements 54A, 54B are in direct contact with the shaft portions 510 of the contact elements 51A, 51B, which, when the heat capacity elements 54A, 54B are metal, produces electrical contacting to the contact elements 51A, 51B. To prevent a short circuit in this case between the contact elements 51A, 51B via the heat capacity elements 54A, 54B, the heat capacity elements 54A, 54B are separated from one another by an electrically insulating housing partition 55 such that the contact elements 51A, 51B are electrically insulated from one another.

FIGS. 5A, 5B and 6A, 6B show another embodiment of a plug-in connector part 5. In a modification to the embodiment according to FIGS. 3A, 3B and 4A, 4B, in this embodiment, openings 542 in the form of blind holes are formed in the heat capacity elements 54A, 54B and are each closed off on the outside by closing elements 543 in the form of screw elements. A material can be arranged in said openings 542 that improves the heat energy absorption capabilities of the heat capacity elements 54A, 54B.

This material can be, for example, a phase change material that can carry out a phase transition, for example from solid to liquid and vice versa, and, in such a phase transition (for example from solid to liquid), absorb and therefore store heat. Phase change materials of this kind can contain salts or paraffins as the storage medium, for example. It is also conceivable to use a low-melting metal alloy (for example having a melting temperature of less than 60° C.), for example a Field's metal.

Whereas in an initial state, when the contact elements 51A, 51B are not heated, the material contained in the openings 542 is for example in a solid state of aggregation, said material can undergo a phase transition when heated and change from a solid state of aggregation into a liquid state of aggregation, with heat being absorbed and therefore stored. Upon cooling, a reversed phase transition can be carried out, as a result of which the heat is dissipated in turn.

In other respects, the embodiment according to FIG. 5A, 5B, 6A, 6B is identical to the embodiment according to FIG. 3A, 3B, 4A, 4B, and therefore reference should be made to the aforementioned explanations.

FIG. 7 is an exploded view of a contact element 51A. In the mounted position, the associated heat capacity element 54A is attached to the shaft portion 510 of the contact element 51A by means of the attachment surface 544 of the attachment piece 540 and is frictionally connected to the shaft portion 510 by means of the screw element 56. For this purpose, the screw element 56 extends through a securing opening 512 in the shaft portion 510 and engages with an associated threaded opening in the attachment piece 540.

The basic concept of the invention is not limited to the embodiments described above but can in principle also be implemented in a completely different manner.

In principle, heat capacity elements of the type described herein can be used in plug-in connector parts in the form of charging sockets or charging plugs in the context of a charging system of an electric vehicle. However, it is also conceivable and possible to use plug-in connector parts of a completely different type outside of a charging system for charging an electric vehicle.

A heat capacity element of the type described herein can be used not only on a contact element for transmitting a direct current, but also on a contact element for transmitting an alternative current.

In a plug-in connector part, all of the contact elements can be connected to a heat capacity element, although it is also conceivable and possible for merely a subgroup of contact elements to be fitted to a relevant associated heat capacity element.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 charging station
2 charging cable
200, 201 end
3 charging plug
30 housing
300, 301 plug-in portion
31 mating contact element
4 vehicle
5 charging socket
50 housing
500, 501 plug-in portion
51A, 51B contact element
510 shaft portion
511 contact pin
512 securing opening
52 contact element
53A, 53B line
54A, 54B heat capacity element
540 attachment piece
541 body
542 opening
543 closing element
544 attachment surface
55 housing partition
56 securing element
E plug-in direction

The invention claimed is:

1. A plug-in connector part for connection to a mating plug-in connector part, comprising:
a housing which has a plug-in portion configured for plug-in connection to the plug-in connector part;
at least one contact element, arranged in the plug-in portion and having a shaft portion, configured to electrically contact an associated mating contact element of the mating plug-in connector part; and
a heat capacity element, which is arranged on the shaft portion of the at least one contact element and rigidly connected to the shaft portion, configured to absorb heat from the at least one contact element.

2. The plug-in connector part according to claim 1, wherein the plug-in connector part has a plurality of contact elements arranged in the plug-in portion, a heat capacity element being arranged on each contact element.

3. The plug-in connector part according to claim 2, wherein heat capacity elements of different contact elements are electrically insulated from one another.

4. The plug-in connector part according to claim 2, wherein a housing partition comprised of electrically insulating material is arranged between adjacent heat capacity elements of two contact elements.

5. The plug-in connector part according to claim 1, wherein the heat capacity element is comprised of metal.

6. The plug-in connector part according to claim 1, wherein the heat capacity element is attached to the shaft portion of the at least one contact element by an attachment piece.

7. The plug-in connector part according to claim 6, wherein the shaft portion of the at least one contact element is cylindrical and the attachment piece has a convex attachment surface that is complementary to a shape of the shaft portion and by which the attachment piece is attached to the shaft portion in a planar manner.

8. The plug-in connector part according to claim 6, wherein the attachment piece is frictionally connected, form-fittingly connected, or integrally bonded to the shaft portion.

9. The plug-in connector part according to claim 1, wherein the heat capacity element has a solid, cuboidal body.

10. The plug-in connector part according to claim 1, wherein the heat capacity element has at least one opening in which a phase change material is arranged.

11. The plug-in connector part according to claim 5, wherein the metal comprises copper or aluminum.

\* \* \* \* \*